C. JEANTAUD.
Vehicle-Wheel.
No. 165,587.
Patented July 13, 1875.
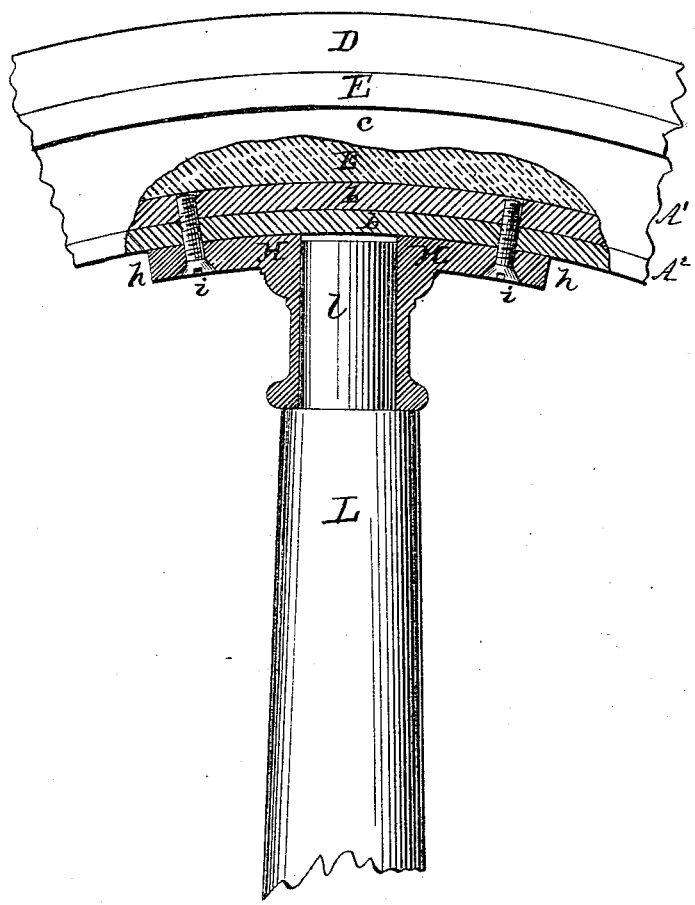
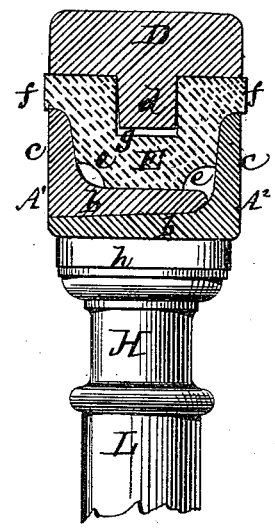
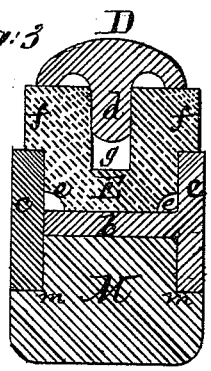
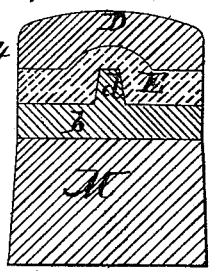

UNITED STATES PATENT OFFICE.

CHARLES JEANTAUD, OF PARIS, FRANCE.

IMPROVEMENT IN VEHICLE-WHEELS.

Specification forming part of Letters Patent No. 165,587, dated July 13, 1875; application filed May 21, 1875.

*To all whom it may concern:*

Be it known that I, CHARLES JEANTAUD, of Paris, in the Republic of France, have invented certain Improvements in Wheels for Vehicles; and I do hereby declare that the following is a full, clear, and exact description of the same, reference being had to the accompanying drawing, which forms part of this specification.

My invention relates to certain improvements which are designed more particularly for application to wheels of vehicles traveling upon common roads, but which may be applied to wheels of railway-cars or vehicles of any description.

The invention consists in a novel construction and combination of the tire and fellies, or a band surrounding said fellies, and an elastic packing interposed between the tire and the fellies or band, whereby the shock, jar, and noise resulting from the contact of the wheels with the road is lessened to a considerable degree, the elasticity of the packing is preserved, and its displacement is prevented.

In the accompanying drawing, Figure 1 is a side view, partly in section, of a portion of a wheel constructed according to my invention. Fig. 2 is a transverse sectional view of the same. Fig. 3 is a transverse sectional view of a modification. Fig. 4 is a similar view of another modification.

When the wheel is constructed in the manner illustrated in Figs. 1 and 2 the wooden felly is dispensed with, and an iron band or continuous felly is substituted therefor. This band may be made in one piece, if desired; but, as shown herein, it is constructed in two parts, $A^1$ $A^2$, each of which is formed with a band portion, $b$, parallel with the axis of the wheel, and with an annular web or rim, $c$, extending outward at right angles with the band $b$, and in one piece therewith. The two parts $A^1$ $A^2$ are placed together, with the band $b$ of one part outside of, and surrounding, the band $b$ of the other part, in which position the webs $c$ form the sides, and one of the bands $b$ the bottom, of a continuous groove, extending entirely around the circumference. The tire D has its exterior surface made in the usual or any suitable form, either flat or rounded, as may be desired. On the interior surface is a continuous tongue or rib, $d$, extending entirely around said inner surface, which rib may be formed with the tire, or attached afterward. The width or thickness of the rib or tongue $d$ is equal to about one-third, more or less, of the width of the groove or space between the webs $c$, and the depth of said rib or tongue is slightly less than the depth of said groove or space. E represents a ring, band, or packing, of india-rubber or other suitable elastic substance, interposed between the band $A^1$ $A^2$ and the tire D. This band or packing E is provided with a groove, $g$, extending entirely around its exterior surface, corresponding in shape with the rib or tongue $d$, and sufficiently larger than said rib to allow it to fit easily therein. The inner side of the packing E is of corresponding form with the space between the webs $c$, except that the edges are rounded off or cut away, as shown at $e$ $e$, to allow for expansion and contraction. The outer edges of the band or packing are formed with flange-like projections $f$ $f$, which lie between the edges of the webs $c$ $c$ and the inner surface of the tire D when the parts are in place together, as shown in Figs. 1 and 2. The band or continuous felly $A^1$ $A^2$, constructed as above described, is connected with the spokes by means of metallic sockets H, provided with extensions or ears $h$. The outer ends of the spokes L are provided with tenons $l$, which are inserted in the sockets. Screws $i$ are passed through the ears $h$ and into the band portions $b$ $b$, by which means the sockets and felly are secured together, and lateral displacement of the two parts $A^1$ $A^2$ is prevented.

By the construction, arrangement, and combination of the various parts, as hereinabove described, I produce a wheel in which the shock, noise, and other inconveniences resulting from the rolling of the wheels over the road, and especially upon rough or uneven ground, are lessened to a considerable extent, and a degree of elasticity is imparted to the wheel such as is unattainable in a wheel of ordinary construction without augmenting the draft of the vehicle; and, while all the advantages resulting from the elasticity of the packing are obtained, said packing is protected from actual contact with the ground, and consequent wear and deterioration.

Fig. 3 of the drawing represents the application of my invention to a wheel constructed with wooden fellies.

The tire D is provided with the rib d, and the packing-ring E is of the same general construction as the one before described. The metallic band surrounding the wooden felly M is made in two parts, one of which is of T shape in its cross-section, forming a band, b, and annular web e; and the other part forms another annular web, c, which is attached to the band portion b by screws. The wooden felly M is provided with rabbets m m, into which fit the inner edges of the webs c c, while the portions of said webs outside the periphery of the band b form a groove for the reception of the inner edge of the packing-ring.

In some cases the band surrounding the wooden fellies may be made in one piece, and may be placed in position when hot, after the usual manner of attaching tires to wheels with wooden fellies; and, where the wooden felly is dispensed with, the grooved band or continuous iron felly may be made in one piece, and attached to the spokes in any suitable manner.

The elastic packing-ring may be made complete, and sprung into place; or, if desired, the rubber may be placed between the band and the tire while in a plastic state, and afterward vulcanized.

The construction, arrangement, and combination of the various parts hereinabove described may be applied to wheels of any description; and the details of construction may be varied according to circumstances without changing the nature of the invention.

If preferred, the tire may be grooved, and the band may be ribbed, and the packing made of corresponding form, as shown in Fig. 4.

What I claim as new, and desire to secure by Letters Patent, is—

In a wheel for vehicles, the combination of a tire having a tongue or a groove on its inner surface, a metallic band, made in one or more pieces, serving as a continuous felly, and having a tongue or a groove on its outer surface, and an elastic packing-ring, interposed between said tire and band, and constructed to allow for its expansion and contraction and prevent its displacement, substantially as described.

CHARLES JEANTAUD.

Witnesses: